(12) United States Patent
Haege et al.

(10) Patent No.: US 10,656,296 B2
(45) Date of Patent: May 19, 2020

(54) PROCESSING OF SEISMIC DATA (71) Applicant: WESTERNGEGO LLC, Houston, TX (US)

(72) Inventors: Martin Haege, Calgary (CA); Shawn Maxwell, Calgary (CA); Lars Kristian Sønneland, Tananger (NO)

(73) Assignee: WESTERNGECO L.L.C., Houston, TX (US)

( * ) Notice: Subject to any disclaimer, the term of this patent is extended or adjusted under 35 U.S.C. 154(b) by 463 days.

(21) Appl. No.: 14/895,846

(22) PCT Filed: Jun. 3, 2014

(86) PCT No.: PCT/US2014/040681
§ 371 (c)(1),
(2) Date: Dec. 3, 2015

(87) PCT Pub. No.: WO2014/197464
PCT Pub. Date: Dec. 11, 2014

(65) Prior Publication Data
US 2016/0124098 A1     May 5, 2016

Related U.S. Application Data

(60) Provisional application No. 61/830,523, filed on Jun. 3, 2013.

(51) Int. Cl.
*G01V 1/30* (2006.01)
*G01V 1/28* (2006.01)
(Continued)

(52) U.S. Cl.
CPC .............. *G01V 1/306* (2013.01); *E21B 49/00* (2013.01); *G01V 1/28* (2013.01); *G01V 1/345* (2013.01); *G01V 2210/64* (2013.01); *G01V 2210/642* (2013.01); *G01V 2210/646* (2013.01); *G01V 2210/74* (2013.01)

(58) Field of Classification Search
CPC .......... G01V 1/306; G01V 1/345; G01V 1/28; G01V 2210/74; G01V 2210/642; G01V 2210/646; G01V 2210/64
See application file for complete search history.

(56) References Cited

U.S. PATENT DOCUMENTS

| 5,671,136 A | 9/1997 | Willhoit, Jr. |
| 6,240,370 B1 | 5/2001 | Sonneland et al. |

(Continued)

OTHER PUBLICATIONS

Maxwell et al., Understanding Hydraulic Fracture Variability Through Integrating Microseismicity and Seismic Reservoir Characterization, Jun. 14-16, 2011, SPE North American Unconventional Gas Conference and Exhibition, Woodlands, Texas, 9 pp.*

(Continued)

*Primary Examiner* — Toan M Le (57) ABSTRACT

A method for processing seismic data is provided, in the method a new attribute indicating rock fabric properties of a subterranean section of the earth is processed from reflection seismic data obtained from the subterranean section of the earth. The processed rock fabric attribute may be used to determine properties of and/or generate an image of the subterranean section of the earth.

14 Claims, 5 Drawing Sheets

(51) Int. Cl.
*E21B 49/00* (2006.01)
*G01V 1/34* (2006.01)

(56) References Cited

U.S. PATENT DOCUMENTS

2005/0135189 A1 6/2005 Wang
2007/0127313 A1 6/2007 Segall et al.
2010/0265797 A1 10/2010 Robertsson et al.
2012/0195165 A1 8/2012 Vu et al.

OTHER PUBLICATIONS

Pedersen et al., New Paradigm of Fault Interpretation, 2003, Society of Exploration Geophysicists, 2003 SEG Annual Meeting, Dallas, TX, 4 pp.*
Abstract of Pedersen et al., 2003, 2 pp.*
Zhe et al., An Automatic Fault Tracking Approach Based on Ant Colony Algorithm, 2012, SEG Las Vegas 2012 Annual Meeting, 5 pp. (Year: 2012).*
Downie, R. C. et al., "Using Microseismic Source Parameters to Evaluate the Influence of Faults on Fracture Treatments — A Geophysical Approach to Interpretation", SPE 134772, presented at the SPE Annual Technical Conference and Exhibition, Florence, Italy, 2010, 13 pages.
Hayles, K. et al., "Comparison of Microseismic Results from the Bakken Formation Processed by Three Different Companies: Integration with Surface Seismic and Pumping Data", SEG, Expanded Abstracts, 2011, pp. 1468-1472.
Haege, M. et al., "Integration of Passive Seismic and 3D Reflection Seismic in an Unconventional Shale Gas Play: Relationship Between Rock Fabric and Seismic Moment of Microseismic Events", SEB Expanded Abstracts, 2012, pp. 1-5.
Keller, W. R. et al., "Correlation of Surface Microseismic Event Distribution to Water Production and Faults Mapped on 3D Seismic Data: A West Texas Case Study", SEG, Expanded Abstracts, 2009, pp. 1524-1526.
Maxwell, S. C. et al., "Enhanced Reservoir Characterization Using Hydraulic Fracture Microseismicity" SPE 140449, presented at the SPE Hydraulic Fracturing Technolgy Conference and Exhibition, The Woodlands TX, 2011, 11 pages.
Maxwell, S. C. et al., "Fault Activation During Hydraulic Fracturing", SEG Expanded Abstracts, 2009, pp. 1552-1556.
Miller, C. et al., "Evaluation of Production Log Data from Horizontal Wells Drilled in Organic Shales", SPE 144326, presented at the SPE North American Unconventional Gas Conference and Exhibition, The Woodlands, TX, 2011, 23 pages.
Norton, M. et al., "Surface Seismic to Microseismic: An Integrated Case Study from Exploration to Completion in the Montney Shale of NE British Columbia, Canada", SEG Expanded Abstracts, 2011, pp. 2095-2099.
Rich, J. P. et al., "Unconventional Geophysics for Unconventional Plays", SPE 131779, presented at the SPE Unconventional Gas Conference, Pittsburgh, PA, 2010, 7 pages.
Wessels, S. A. et al., "Identifying Faults and Fractures in Unconventional Reservoirs through Microseismic Monitoring", First Break, 2011, 29(7), pp. 99-104.
Wikel, K., "Geomechanics: Bridging the Gap from Geophysics to Engineering in Unconventional Reservoirs", First Break, 2011, 29(10), pp. 71-80.
Search Report and Written Opinion of International Application No. PCT/US2014/040681 dated Oct. 2, 2014, 14 pages.
International Preliminary Report on Patentability International Application No. PCT/US2014/040681 dated Dec. 17, 2015, 10 pages.

* cited by examiner

PROCESSING OF SEISMIC DATA

This application is the U. S. National Stage under 35 U.S.C. § 371 of Patent Cooperation Treaty Application Number PCT/US2014/040681 filed Jun. 3, 2014, which claims the benefit of U.S. Provisional Application No. 61/830,523, filed on Jun. 3, 2013.

BACKGROUND

The characterisation of subsurface strata is important for, among other things, identifying, accessing and managing reservoirs. The depths and orientations of such strata can be determined, for example, by seismic surveying. This is generally performed by imparting energy to the earth at one or more source locations, for example, by way of controlled explosion, mechanical input, vibration mechanism etc. Return energy is then measured at surface receiver locations, marine receiver locations at varying distances and azimuths from the source location. The travel time of energy from source to receiver, via reflections and refractions from interfaces of subsurface strata, indicates the depth and orientation of the strata.

Passive or microseismic measurements can be characterized as a variant of seismics. In conventional seismic explorations a seismic source placed at a predetermined location, such as one or more airguns, vibrators or explosives, is activated and generates sufficient acoustic energy to cause acoustic waves to travel through the Earth. Reflected or refracted parts of this energy are then recorded by seismic receivers such as hydrophones and geophones. The terms passive seismic and microseismic are used interchangeably herein.

In microseismic monitoring there is no actively controlled and triggered seismic source at a known location. The seismic energy is generated through so-called microseismic events caused by subterranean shifts and changes that at least partially give rise to acoustic waves which in turn can be recorded using suitable receivers. Although the microseismic events may be a consequence of human activity disturbing the subterranean rock, the events are quite different from operation of equipment provided as an active seismic source.

Microseismic monitoring has become a standard technique to monitor fracture propagation during hydraulic fracture stimulation.

Reservoir and completion quality are parameters used to define shale reservoirs. Shales are highly textural anisotropic rocks with varying diagenetic histories and mineralogical contents, which often lead to complex fracture networks. In shales, dissimilarities in fracture evolution within a short interval along lateral treatment wells are commonly observed. Factors responsible for the variability are still poorly understood. Besides local stress variations and rock properties, pre-existing faults and other zones of weakness of the rock are assumed to play a major role. Pre-existing faults can result in undesired reservoir stimulation by, for instance, guiding hydraulic fractures to water-bearing zones. Consequently, in order to properly control/manage a fracturing process, detailed knowledge about the fault network is very important, if not essential.

However, rock fabric is at the limit of, or even below, 3D reflection seismic resolution, which makes mapping the fault network/rock fabric a challenging task. For purposes of this disclosure, the term "rock fabric" is used to describe pre-existing small scale discontinuities and zones of weakness of the rock/formation and the term "fracture(s)" is used to describe hydraulically induced fractures produced through stimulation of the rock/formation; such as in a hydraulic fracturing process where fracturing fluids are pumped into a wellbore to fracture the rock/formation surrounding the wellbore.

SUMMARY

In general terms, embodiments of the present invention involve methods for investigating rock fabric, which may be derived from for example, but not by way of limitation, 3D reflection seismic data. This data may be integrated with passive seismic as a technique for reservoir characterization.

For example, embodiments of the present invention can be concerned with the interaction between rock fabric and a seismic, preferably microseismic, response to hydraulic stimulations. Embodiments of the present invention can provide methods to integrate rock fabric mapped on 3D reflection seismic data with microseismic information from hydraulic fracture monitoring. In some aspects, a new seismic attribute may be applied to capture/identify the rock fabric from 3D reflection seismic data.

It has been found that regions with a high degree of rock fabric can correlate with microseismic events with a high seismic moment, a low P/SH ratio and a tectonic b-value of around 1. In areas with a high degree of rock fabric, fracture complexity increases as a result of changing rock properties and/or perturbations of in-situ stresses. Seismic/microseismic data can be applied to show that differing production behaviour between wells (e.g. three wells in a detailed example described below) may be explained by the changing degree of rock fabric. As such, in some aspects, the rock fabric attribute may be used to understand/predict well behaviour.

In some embodiments, microseismic event location determined from hydraulic fracture monitoring may be correlated with observations from 3D reflection seismic, where the 3D reflection seismic data is interpreted/analyzed with the rock fabric attribute. The rock fabric attribute may be used to interpret/be integrated with the microseismic data for analysis of the properties of a subsurface section of the earth that has been subject to and may be subject to further hydraulic fracturing. In such situations, uncertainties can be taken into account when evaluating/integrating the 3D reflection seismic together with the passive seismic (microseismic) data.

Thus, in a first aspect, one embodiment of the present invention provides a method for processing seismic data comprising:

providing (e.g. receiving) reflection seismic data for a subterranean section of the earth;

processing an attribute indicating rock fabric properties of the subterranean section of the earth from the reflection seismic data; and using the processed attribute to determine properties of and/or generate an image of the subterranean section of the earth.

The method of the first aspect may have any one or, to the extent that they are compatible, any combination of the following optional features.

The method may further comprise generating the reflection seismic data by performing seismic testing, for example by triggering one or more seismic sources at a known location(s) and recording reflected seismic energy.

The attribute indicating rock fabric properties may comprise a rotational of a 3D vector field. For example, the 3D vector field may be defined by (Inline, XLine, Z).

The method may further comprise:

providing (e.g. receiving) microseismic data for the subterranean section of the earth; and
integrating the processed attribute and the microseismic data.

The method may further comprise smoothing the processed attribute to account for location uncertainty of the microseismic data. For example, the processed attribute may be smoothed with a Gaussian filter to compensate for spatial discrepancies.

Integrating the processed attribute and the microseismic data may comprise using the processed attribute to interpret the microseismic data. For example, the processed attribute can be mapped onto the microseismic data.

Integrating the processed attribute and the microseismic data may comprise determining seismic moments, P/SH ratios and/or b-values associated with the microseismic data. In some embodiments, any two or all three of seismic moments, P/SH ratios and/or b-values are determined. In particular, as mentioned above, regions with a high degree of rock fabric can correlate with microseismic events with a high seismic moment, a low P/SH ratio and a tectonic b-value of around 1.

Integrating the processed attribute and the microseismic data may comprise using the processed attribute and the microseismic data to determine the properties of and/or generate the image of the subterranean section of the earth.

The method may further comprise:
performing an amplitude variation with offset analysis of the seismic data to determine elastic properties (such as minimum Poisson's ratio) of the subterranean section of the earth; and
integrating the determined elastic properties and the microseismic data.

Integrating the determined elastic properties and the microseismic data may comprise using the determined elastic properties to interpret the microseismic data.

The method may further comprise:
generating the microseismic data by performing one or more hydraulic fracturing processes in a wellbore penetrating the subterranean section of the earth.

A second aspect of an embodiment of the present invention provides a procedure for operating a well associated with the subterranean section of the earth, the procedure including:
performing the method of the first aspect; and
using the results of the method to manage the operation of the well.

Further aspects of embodiments of the present invention provide: a computer program comprising code which, when run on a computer, causes the computer to perform the method of the first aspect; a computer readable medium storing a computer program comprising code which, when run on a computer, causes the computer to perform the method of the first aspect; and a computer system programmed to perform the method of the first aspect. For example, a computer system can be provided for processing seismic data, the system including one or more processors configured to: process an attribute indicating rock fabric properties of the subterranean section of the earth from provided reflection seismic data; and using the processed attribute to determine properties of and/or generate an image of the subterranean section of the earth. The system thus corresponds to the method of the first aspect. The system may further include a computer-readable medium or media operatively connected to the processors, the medium or media storing the reflection seismic data, and optionally the microseismic data. The system may further include a display device operatively connected to the processors for displaying images of the subterranean section of the earth.

BRIEF DESCRIPTION OF THE DRAWINGS

Embodiments of the invention will now be described by way of example with reference to the accompanying drawings in which:

FIG. 2 shows (a) a section through the gradient field of a seismic cube, with the normal vectors of the gradient field indicated by arrows, and (b) the same section, but with the arrows now indicating the magnitude of the rotation of the normal vectors;

FIG. 6 shows the top view, wells and microseismic events of FIG. 3 superimposed on (a) a contour map of the logarithm of seismic moment, and (b) a contour map of b-value;

FIG. 9 shows (a) microseismic events with associated uncertainty ellipsoids, and (b) patches indicating areas with a high degree of rock fabric.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Reference will now be made in detail to embodiments, examples of which are illustrated in the accompanying drawings and figures. In the following detailed description, numerous specific details are set forth in order to provide a thorough understanding of the subject matter herein. However, it will be apparent to one of ordinary skill in the art that the subject matter may be practiced without these specific details. In other instances, well known methods, procedures, components, and systems have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step. The first object or step, and the second object or step, are both objects or steps, respectively, but they are not to be considered the same object or step.

The terminology used in the description of the disclosure herein is for the purpose of describing particular embodiments only and is not intended to be limiting of the subject matter. As used in this description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Also, it is noted that embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

As disclosed herein, the term "computer readable medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Interpreting properties of subterranean sections of the earth and/or generating images of such subterranean sections of the earth by combining data from 3D reflection seismic and passive seismic (microseismic) data is an area of growing interest. However, meaningfully integrating data from the two different seismic techniques has proved to be challenging.

Manual mapping of faults using seismic data is a time-consuming task. As such, automatic tools and workflows are commonly used in seismic data interpretation to highlight and extract faults in order to reduce interpretation time and increase objectivity.

Figure 1:
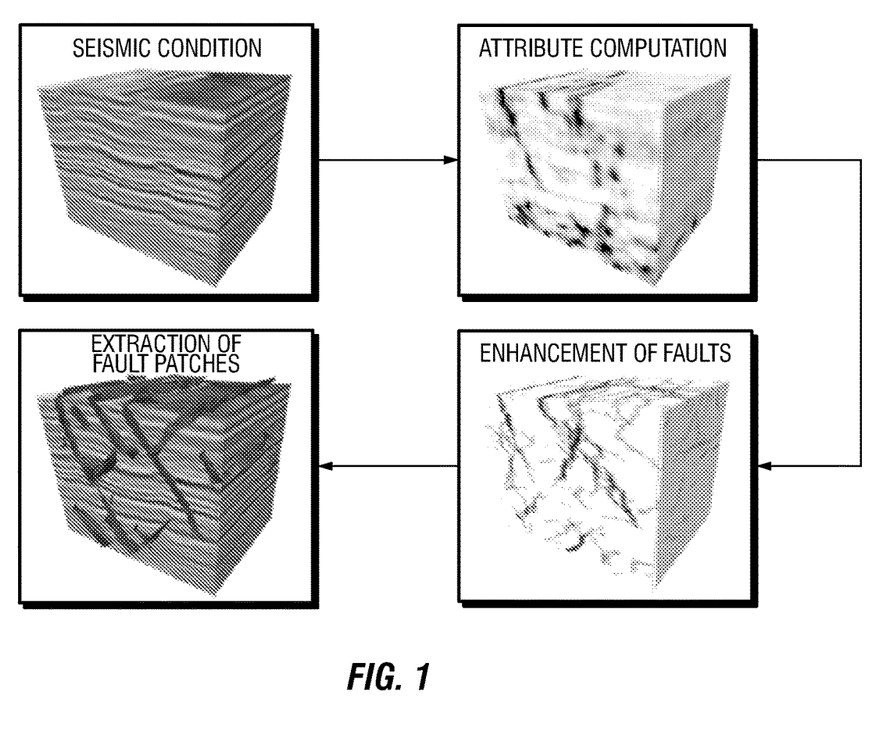
FIG. 1 shows a basic workflow for mapping faults.

A typical workflow for fault extraction, illustrated in FIG. 1, consists of seismic pre-conditioning (conditioning the data for further processing), attribute computation (apply selected attribute(s) computations on the conditioned seismic data), enhancement of faults (processing the attributes to generate an image/parameters of faults in a formation being investigated), and extraction of fault patches (identifying fault patterns/geometries/patches in the enhanced faults). The step of "enhancement of faults" increases the signal (faults) to noise ratio by suppressing small features. This step is important when mapping large scale faults.

Each step of the workflow is a challenging task and still subject to extensive research in the seismic industry. Different methods and techniques are applied to the process depending on the purpose of investigation and desired data quality, e.g. detection of large/small scale faults etc. In the present invention, focus may be placed on the attribute computation step so that as much information as possible is retained in the processing in order to characterize the rock fabric.

In an embodiment of the present invention, a new seismic attribute may be applied to the seismic data, which attribute may provide for detecting spatial changes in the 3D normal vector field. Polynomial reconstruction of the seismic traces can provide an analytical representation with sub-seismic resolution (see e.g. U.S. Pat. No. 6,240,370, which is incorporated herein for all purposes). The normal vectors can be computed using the gradient field of the seismic cube by calculation of the partial derivatives. Horizons with sub-sample precision may then be extracted from the extrema points (extrema in the seismic data correspond to zero crossings on the time derivative).

Figure 2A:
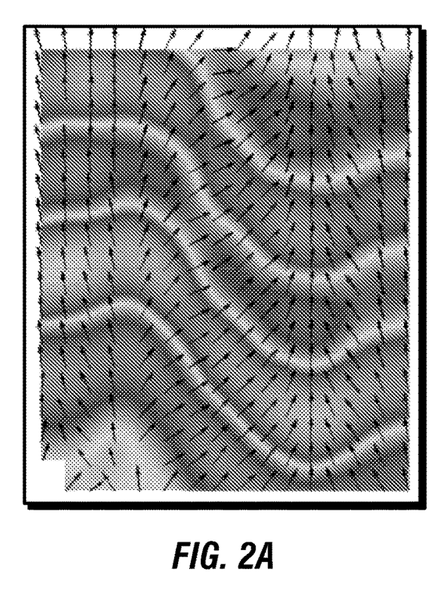

FIG. 2(a) shows a section through the gradient field of a seismic cube, with the normal vectors of the gradient field indicated by arrows. According to an embodiment of the present invention, the magnitude of the rotation of the 3D normal vector field captures subtle changes in seismic reflections and hence subtle changes in the imaged subsurface rocks.

Figure 2B:
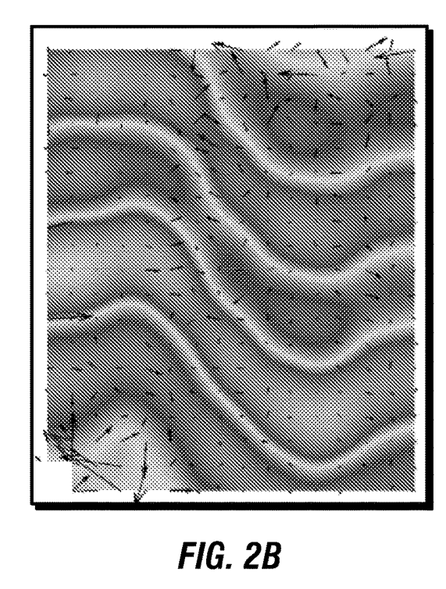

FIG. 2(b) shows the same section, but with the arrows now indicating the magnitude of the rotation of the normal vectors.

This vector attribute (the magnitude of the rotation of the 3D normal vector field), in accordance with an embodiment of the present invention, can capture sub-seismic resolution and enables mapping of changes in the rock fabric. Accordingly, in an embodiment of the present invention, the attribute may be used to characterize rock fabric. Subsequently, in accordance with embodiments of the present invention, the rock fabric may be used for interpretation/mapping of microseismic data using the 3D seismic data.

In seismic processing, there are uncertainties involved when comparing information derived from/observed in 3D reflection seismic data with information derived from/observed in passive seismic data. For example, different velocity models may have been used in processing the different kinds of seismic data, i.e. different velocity models used for the migration of the 3D reflection seismic and for microseismic event location. In addition, there can be uncertainties in microseismic event location due to unfavourable source-receiver distance, inaccurate velocity model(s) and/or poor receiver coverage etc. Another source of uncertainty in the seismic/microseismic data is attributable to resolution and/or scaling. Microseismic events recorded during hydraulic stimulation have a source radius typically less than 10 meters and this may be at the limit of the 3D reflection seismic resolution, which makes comparison of the different sets of data a challenging task.

Further, 3D reflection seismic may be affected by acquisition footprints, which may lead to biased fault illumination. Such biased fault illumination may make it difficult to interpret the microseismic data using the 3D reflection seismic data. To account for such spatial uncertainties, the seismic attribute cube for the rock fabric attribute generated from the 3D reflection seismic data, in accordance with embodiments of the present invention, may be smoothed with a Gaussian filter to compensate for spatial discrepancies. In certain aspects, the size of the smoothing window may be guided by the location uncertainty of the microseismic events. This smoothing can provide a compromise between honouring uncertainties and retaining details.

A smoothed seismic attribute cube containing the magnitude of the rotation of the 3D normal vector field, in accordance with one embodiment of the present invention, was used to investigate a possible correlation between microseismic events with a high seismic moment and areas, identified from the 3D reflection seismic data, with a high degree of rock fabric.

Figure 3:
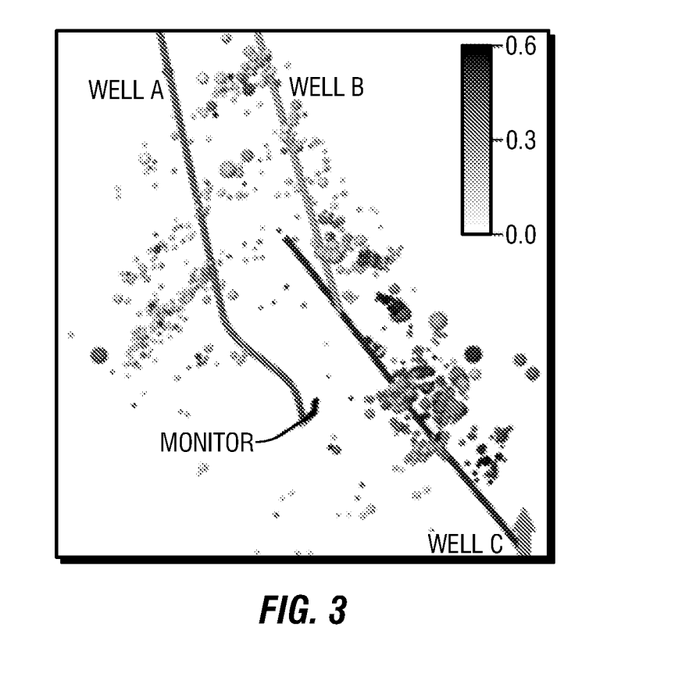
FIG. 3 shows a top view of a monitor well and three horizontal treatment Wells A, B and C, spheres representing microseismic events being sized by magnitude and coloured by seismic attribute, with dark colours representing high degree of rock fabric.

FIG. 3 shows a top view of a monitor well and three horizontal treatment wells (Wells A, B and C), with spheres representing microseismic events. The north-south (N-S) extent is about 1600 m. Seismic attribute values were mapped on the microseismic events, as determined from the microseismic data. The seismic and microseismic data were collected from a formation surrounding the three wells.

FIG. 3 displays the microseismic event set (processed from the microseismic data,) coloured by rock fabric (processed from the 3D reflection seismic data), with the darker colours/regions corresponding to higher degrees of rock fabric. Magnitudes are indicated by the size of the spheres, the larger the spheres the higher the magnitudes. Significant differences in microseismic response are observed in the formation.

In general, the induced seismicity around Well A and Well B indicates fractures oriented perpendicular to the least principle stress direction whereas the fractures around Well C tend to be scattered and heterogeneous in shape. The area in the southeast (SE) around Well C shows a concentration of microseismic events with a high degree of rock fabric, as processed from the rock fabric attribute. This suggests reactivation of pre-existing zones of weakness of the rock in this region, which is also indicated by a general lower P/SH ratio of the microseismic events.

Figure 4:
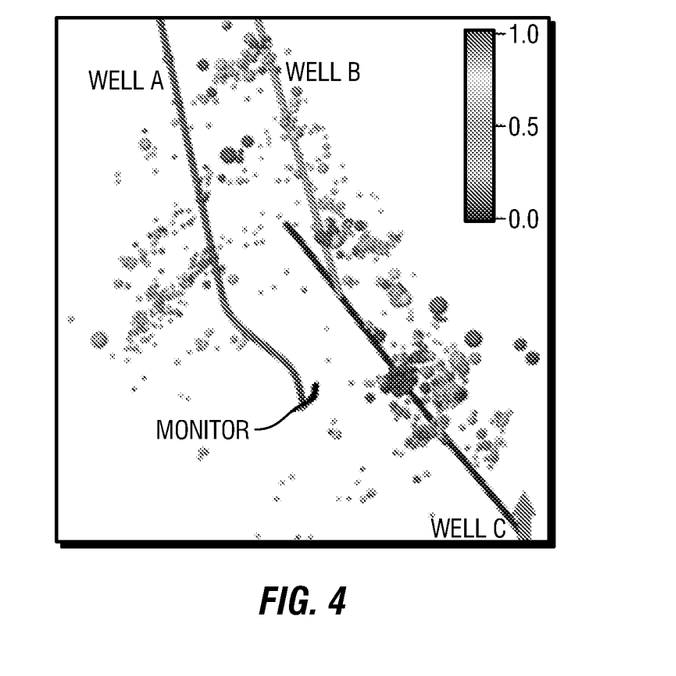
FIG. 4 shows the top view, wells and microseismic events of FIG. 3, but with the microseismic events now coloured by the respective P/SH ratio.

FIG. 4 shows the top view, wells and microseismic events of FIG. 3, but with the microseismic events now coloured by the respective P/SH ratio (processed from the microseismic data). Shear failure dominates around Well C whereas hybrid tensile-shear fracture behaviour is favoured around Wells A and B.

Figure 5:
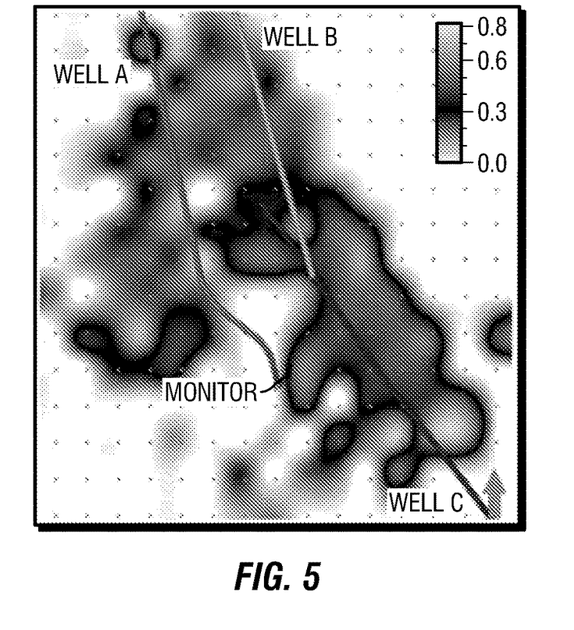
FIG. 5 shows the top view and wells of FIG. 3 superimposed on a density map of degree of rock fabric.

It can be helpful to consider general trends, rather than single events, due to the uncertainties mentioned above. In accordance with an embodiment of the present invention, a density map of rock fabric was calculated for this purpose. The area was divided into 15 by 15 cells for each of which the cumulative sum of the attribute values was taken. FIG. 5 shows the top view and wells of FIG. 3 superimposed on the density map of rock fabric. As can be seen in FIG. 5, a concentration of high degree of rock fabric is located in the SE of the area.

Reactivation of pre-existing faults typically produces higher magnitude microseismic events tending to exhibit a tectonic b-value of around 1, whereas hydraulically induced fractures are typically accompanied by low magnitude events exhibiting a higher b-value.

Figure 6A:
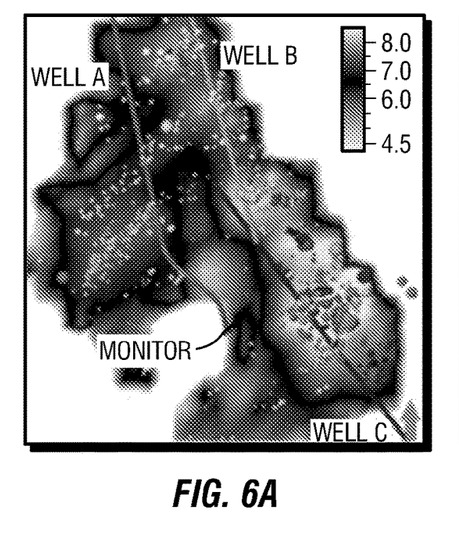
Figure 6B:
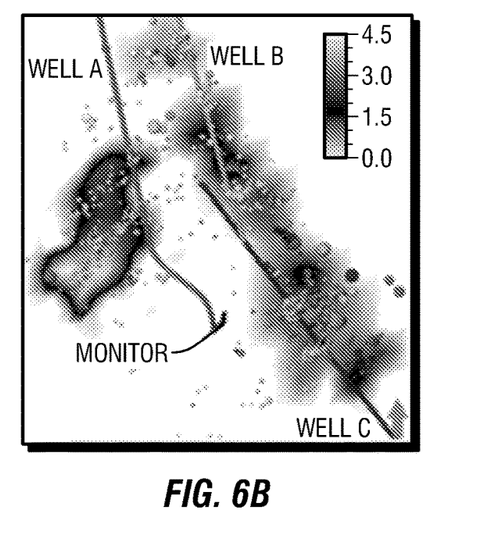

FIG. 6 shows the top view, wells and microseismic events of FIG. 3 superimposed on (a) a contour map of the logarithm of seismic moment, and (b) a contour map of b-value (slope of magnitude frequency relationship).

Comparing FIG. 5 with FIG. 6, a correlation between areas with a high seismic moment, b-value around 1 and a high degree of rock fabric can be observed. Regions with a low degree of rock fabric are correlated with low magnitude events and a high b-value.

It has been found that areas with a low Poisson ratio ("PR") can be associated with an enhanced relative production (see e.g. Norton, M., W. Hovdebo, D. Cho, M. Jones, and S. Maxwell, 2010, SURFACE SEISMIC TO MICROSEISMIC: AN INTEGRATED CASE STUDY FROM EXPLORATION TO COMPLETION IN THE MONTNEY SHALE OF NE BRITISH COLUMBIA, *Canada: 80th Annual International Meeting, SEG, Expanded Abstracts*, 2095-2099, which is incorporated herein for all purposes). An amplitude variation with offset (AVO) analysis of the seismic data was performed and inverted for elastic properties (using the approach of Norton et al.).

Figure 7:
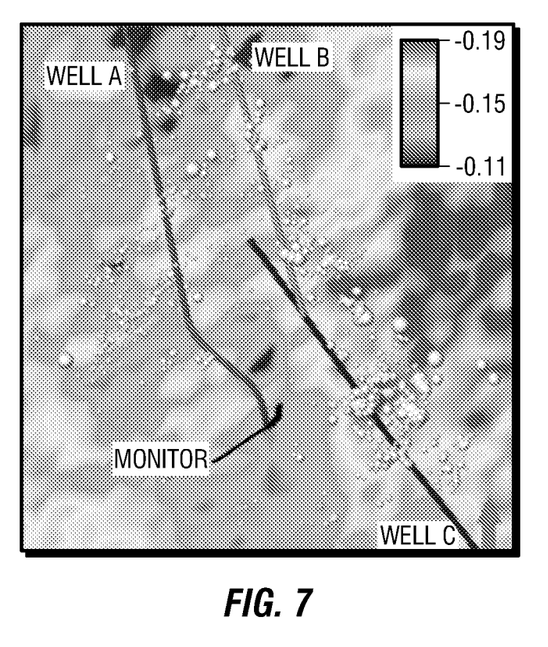
FIG. 7 shows the top view, wells and microseismic events of FIG. 3 superimposed with a minimum PR map for a vertical interval.

FIG. 7 shows the top view, wells and microseismic events of FIG. 3 superimposed with the minimum PR map. The minimum PR map was calculated for a vertical interval of interest (in which the majority of the microseismic events occurred). Wells A and B are situated in low PR regions. Well C is located at the transition zone between low PR to the SW and high PR to the NE.

Figure 8:
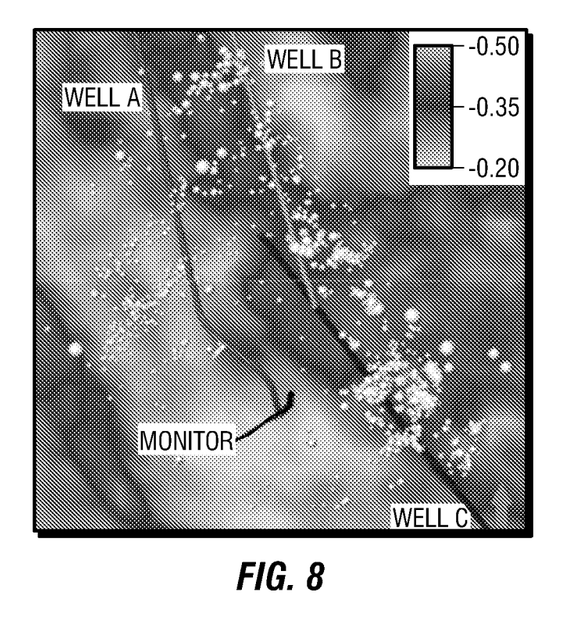
FIG. 8 shows the top view, wells and microseismic events of FIG. 3 superimposed with a rock fabric map for the same vertical interval.

FIG. 8 shows the top view, wells and microseismic events of FIG. 3 superimposed with a rock fabric map for the same vertical interval, the degree of rock fabric being computed from the mean seismic attribute value for each seismic trace in the interval. This rock fabric map was calculated by taking the mean seismic attribute value for each seismic trace in the interval of interest (same vertical interval which was used for the PR map).

There is a high PR and a high degree of rock fabric in the region NE of Well C. In an isotropic medium, low PR is associated with low horizontal stresses which make these areas preferable for fracture propagation. This is observed for the microseismic events around Wells A and B and for a few small magnitude events SW of Well C. However, the majority of microseismic events around Well C do not occur towards SW in the low PR region, they are concentrated rather in the area of high PR and high degree of rock fabric.

Horizontal stress ratio can be assumed to determine fracture growth. High stress anisotropy leads to planar fractures, and low stress anisotropy leads to a complex interacting fracture development. Complex fracture networks tend to create a larger area of reservoir contact, which is important for production optimization. A general high horizontal stress ratio might be perturbed locally by the presence of high degree of rock fabric. The fracture behaviour around Well C may be explained by a complex interaction between in-situ stress perturbation and/or change in rock properties and rock fabric. This interaction may also explain the relatively high production rate and the relatively steep initial pressure decline observed on Well C.

Detailed knowledge of spatial rock fabric distribution may also help adjust real-time stimulation in order to prevent out of zone fracturing. During real-time monitoring microseismic events are detected and located. Besides other attributes, location uncertainty is determined for each microseismic event. A volume, defined by the location uncertainty (uncertainty ellipsoid), around each microseismic event can then be searched for an increased degree of rock fabric. Fault patches can be extracted in those areas of a high degree of rock fabric in real-time. This provides information about potential out of zone stimulation.

Figure 9A:
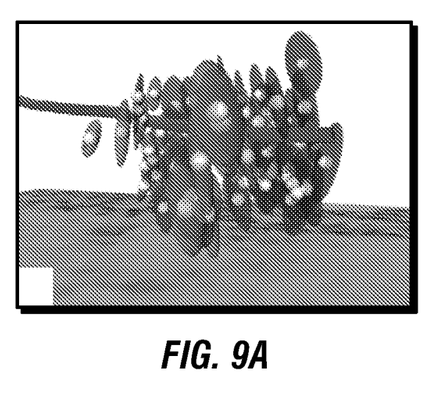
Figure 9B:
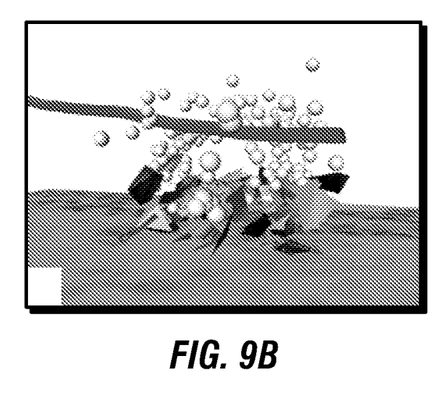

FIG. 9 shows (a) microseismic events with associated uncertainty ellipsoids, and (b) patches indicating areas with a high degree of rock fabric.

Understanding the behaviour of fractures induced by hydraulic stimulation can be important to optimize production. Fracture propagation is mainly influenced by in-situ stresses, rock properties and pre-existing faults. Beside large scale faults, subtle zones of weakness of the rock (rock fabric) play an important role. In embodiments of the present invention, rock fabric can be mapped on 3D reflection seismic and integrated into results from passive microseismic monitoring. This integration facilitates interpretation of the microseismic data to understand properties of a formation fractured by one or more hydraulic fracturing procedures and/or production properties of the fractured formation and/or reservoir properties of the fractured formation. As such, the integrated 3D reflection seismic and microseismic data can be used to manage hydraulic fracturing processes, manage a hydrocarbon reservoir and/or model hydrocarbon production from a well penetrating the fractured formation.

According to embodiments of the present invention, a new seismic vector attribute can be applied, which picks up subtle discontinuities in the subsurface rock providing high level of detail of the rock's heterogeneity. Smoothing of the seismic attribute can compensate for the uncertainties when combining 3D reflection seismic with passive seismic. Fracture complexity, seismic moment and source mechanism can be correlated to rock fabric. This information can then be used to assist fracture engineering design.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

The invention claimed is:

1. A method for characterizing a subterranean section of the earth, the method comprising:
   placing one or more seismic sources at one or more known locations;
   placing one or more seismic receivers at varying distances from the one or more seismic source locations;
   obtaining seismic data from the subterranean section of the earth by triggering the one or more seismic sources and recording reflected seismic energy from the subterranean section of the earth with the one or more seismic receivers;
   determining, by a computer, a rock fabric attribute of the subterranean section of the earth from the seismic data obtained from the subterranean section of the earth, wherein the rock fabric attribute is given by a rotation of normal vectors of a 3D gradient field extracted from a seismic cube of the seismic data;
   using the rock fabric attribute to determine properties of and/or to generate an image of the subterranean section of the earth; and
   using the determined properties and/or the generated image in designing increased reservoir contact area during hydraulic fracturing and/or in real-time by reducing out of zone hydraulic fracturing.

2. The method of claim 1, wherein the 3D vector field is defined by (Inline, Xline, Z).

3. The method of claim 1, further comprising:
   collecting microseismic data from the subterranean section of the earth; and
   integrating the rock fabric attribute and microseismic data.

4. The method of claim 3, further comprising:
   smoothing the rock fabric attribute to account for location uncertainty of the microseismic data.

5. The method of claim 3, wherein integrating the rock fabric attribute and the microseismic data comprises using the processed attribute to interpret the microseismic data.

6. The method of claim 3, wherein integrating the rock fabric attribute and the microseismic data comprises using the rock fabric attribute and the microseismic data to determine the properties of and/or to generate the image of the subterranean section of the earth.

7. The method of claim 3, further comprising:
   performing an amplitude variation with offset analysis of the seismic data to determine elastic properties of the subterranean section of the earth; and integrating the determined elastic properties and the microseismic data.

8. The method of claim 3, further comprising:
generating the microseismic data by performing one or more hydraulic fracturing processes in a wellbore while penetrating the subterranean section of the earth.

9. The method of claim 3, wherein collecting microseismic data from the subterranean section of the earth is performed during hydraulic stimulation of the subterranean section of the earth.

10. The method of claim 1, wherein the rock fabric attribute is given by a magnitude of the rotation of the normal vectors of the 3D gradient field.

11. The method of claim 1, wherein determining the rock fabric attribute includes determining a magnitude of the rotation of each of a plurality of normal vectors within the 3D gradient field.

12. The method of claim 11, wherein determining a magnitude of the rotation of each of a plurality of normal vectors within the 3D gradient field captures the rock fabric attribute at a sub-seismic resolution.

13. The method of claim 1, wherein determining the rock fabric attribute of the subterranean section includes generating at least one of a density map of rock fabric, a contour map of a logarithm of seismic moment, or a contour map of b-value.

14. A method for characterizing a subterranean section of the earth, the method comprising:
placing one or more seismic sources at one or more known locations;
placing one or more seismic receivers at varying distances from the one or more seismic source locations;
collecting microseismic data from the subterranean section of the earth;
obtaining seismic data from the subterranean section of the earth by triggering the one or more seismic sources and recording reflected seismic energy from the subterranean section of the earth with the one or more seismic receivers;
determining, by a computer, a rock fabric attribute of the subterranean section of the earth from the seismic data obtained from the subterranean section of the earth, wherein the rock fabric attribute is given by a rotation of a 3D vector field extracted from a seismic cube of the seismic data;
using the rock fabric attribute to determine properties of and/or to generate an image of the subterranean section of the earth;
integrating the rock fabric attribute and microseismic data, wherein integrating the rock fabric attribute and the microseismic data comprises determining seismic moments, P/SH ratios and/or b-values associated with the microseismic data, where P and SH are components of a seismic wavefield and b-value is a tectonic parameter;
smoothing the rock fabric attribute to account for location uncertainty of the microseismic data; and
using the determined properties and/or the generated image in designing increased reservoir contact area during hydraulic fracturing and/or in real-time by reducing out of zone hydraulic fracturing.

* * * * *